United States Patent
De Shetler et al.

(10) Patent No.: US 11,645,656 B2
(45) Date of Patent: May 9, 2023

(54) MACHINE LEARNING-BASED DETERMINATION OF LIMITS ON MERCHANT USE OF A THIRD PARTY PAYMENTS SYSTEM

(71) Applicant: Intuit Inc., Mountain View, CA (US)

(72) Inventors: Natalie De Shetler, Mountain View, CA (US); Henry Venturelli, Los Angeles, CA (US); Taylor Cressy, Los Angeles, CA (US); Nikolas Terani, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 257 days.

(21) Appl. No.: 16/557,962

(22) Filed: Aug. 30, 2019

(65) Prior Publication Data
US 2021/0065191 A1 Mar. 4, 2021

(51) Int. Cl.
*G06F 17/18* (2006.01)
*G06N 20/00* (2019.01)
*G06Q 20/40* (2012.01)

(52) U.S. Cl.
CPC ......... *G06Q 20/4016* (2013.01); *G06F 17/18* (2013.01); *G06N 20/00* (2019.01)

(58) Field of Classification Search
CPC ..... G06Q 20/4016; G06N 20/00; G06F 17/18
See application file for complete search history.

(56) References Cited

U.S. PATENT DOCUMENTS

| | | | | |
|---|---|---|---|---|
| 5,412,738 A | * | 5/1995 | Brunelli | G06K 9/00885 382/115 |
| 7,857,212 B1 | * | 12/2010 | Matthews | G06Q 20/405 235/380 |
| 8,655,773 B1 | * | 2/2014 | Fasoli | G06Q 40/00 705/40 |
| 10,147,065 B1 | * | 12/2018 | Yiftachel | G06Q 30/06 |
| 2003/0164398 A1 | * | 9/2003 | Walker | G06Q 30/06 235/375 |

(Continued)

OTHER PUBLICATIONS

Patterson et al. ("Deep Learning—A Practitioner's Approach", O'Reilly, Chapters: Vectorization, pp. 588 to 643, Jul. 27, 2017) (Year: 2017).*

*Primary Examiner* — Christine M Behncke
*Assistant Examiner* — Henry H Jung
(74) *Attorney, Agent, or Firm* — Ferguson Braswell Fraser Kubasta PC

(57) ABSTRACT

In general, in one aspect, one or more embodiments relate to a method including receiving, in a business rules engine, input data from disparate data sources. The input data describes a merchant and an application by the merchant to use an electronic payments system for processing transactions between the merchant and customers. Featurization is performed on the input data to form a machine readable vector. By applying the machine readable vector as input to a machine learning model in a machine learning layer, a risk score is predicted. The machine learning model is trained using training data describing use of the electronic payments system by other merchants. The risk score is an estimated probability of the merchant being unable to satisfy an obligation of using the electronic payments system. A business rules engine, based on the risk score, limits use of the electronic payments system by the merchant.

12 Claims, 8 Drawing Sheets

(56) References Cited

U.S. PATENT DOCUMENTS

| | | | | |
|---|---|---|---|---|
| 2018/0053114 | A1* | 2/2018 | Adjaoute | G06N 3/126 |
| 2019/0095785 | A1* | 3/2019 | Sarkar | G06N 20/00 |
| 2019/0122139 | A1* | 4/2019 | Perez | G06F 16/2452 |
| 2019/0392450 | A1* | 12/2019 | Gosset | G06Q 20/401 |
| 2020/0311049 | A1* | 10/2020 | Alagumuthu | G06F 16/2365 |
| 2020/0327548 | A1* | 10/2020 | Hartard | G06Q 30/018 |
| 2020/0327590 | A1* | 10/2020 | Handelman | G06Q 30/0627 |

\* cited by examiner

US 11,645,656 B2

MACHINE LEARNING-BASED DETERMINATION OF LIMITS ON MERCHANT USE OF A THIRD PARTY PAYMENTS SYSTEM

BACKGROUND

Use of online transaction tools is becoming more common in the modern marketplace. For example, a merchant may use a third party electronic payments system to accept payments from customers. The third party electronic payments system manages the transference of monetary funds from a customer account to a merchant account. The merchant may retrieve the monetary funds from the merchant account. The third party electronic payments system imposes obligations on the merchant, such as to reimburse the third party in the event that the customer receives a refund based on a chargeback.

SUMMARY

In general, in one aspect, one or more embodiments relate to a method. The method includes receiving, in a business rules engine, input data from a plurality of disparate data sources. The input data describes a merchant and an application by the merchant to use an electronic payments system for processing a plurality of transactions between the merchant and a plurality of customers. The method also includes performing featurization on the input data to form a machine readable vector. The method also includes predicting, by applying the machine readable vector as input to a machine learning model in a machine learning layer, a risk score, the machine learning model trained using training data describing use of the electronic payments system by a plurality of other merchants. The risk score comprises an estimated probability of the merchant being unable to satisfy an obligation of using the electronic payments system. The method also includes limiting, by a business rules engine based on the risk score, use of the electronic payments system by the merchant.

One or more embodiments also relate to a system. The system includes a data repository storing a machine learning model. The data repository also stores a machine readable vector. The data repository also stores a risk score comprising an estimated probability of the merchant being unable to satisfy an obligation of using an electronic payments system to process a plurality of transactions with a plurality of customers. The data repository also stores input data from a plurality of disparate data sources. The input data describes a merchant and an application by the merchant to use the electronic payments system. The system also includes a business rules engine configured to: receive the input data prior to calculation of the risk score; receive the risk score after calculation of the risk score; and limit, based on the risk score, use of the electronic payments system by the merchant. The system also includes a featurization layer configured to perform featurization on the input data to generate the machine readable vector. The system also includes a machine learning layer configured to receive the machine readable vector. The machine learning layer is also configured to execute the machine learning model using the machine readable vector as input. The machine learning layer is also configured to predict the risk score as an output of the machine learning model.

One or more embodiments also relate to a non-transitory computer readable medium comprising computer readable program code. The computer readable program code is for causing a computer system to receive, in a business rules engine, input data from a plurality of disparate data sources. The input data describes a merchant and an application by the merchant to use an electronic payments system for processing a plurality of transactions between the merchant and a plurality of customers. The computer readable program code is also for causing a computer system to perform featurization on the input data to form a machine readable vector. The computer readable program code is for causing a computer system to predict, by applying the machine readable vector as input to a machine learning model in a machine learning layer, a risk score, the machine learning model trained using training data describing use of the electronic payments system by a plurality of other merchants. The risk score comprises an estimated probability of the merchant being unable to satisfy an obligation of using the electronic payments system. The computer readable program code is for causing a computer system to limit, by a business rules engine based on the risk score, use of the electronic payments system by the merchant.

Other aspects of the invention will be apparent from the following description and the appended claims.

DETAILED DESCRIPTION

Figure 1:
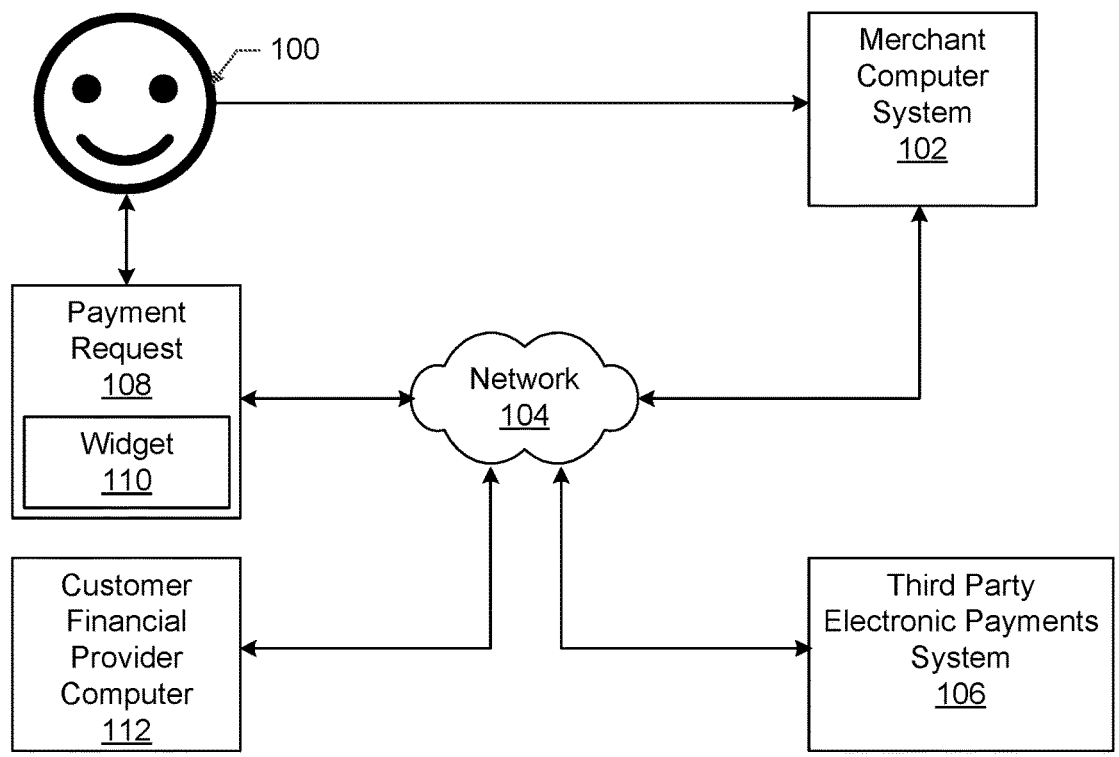
FIG. 1 and FIG. 2 describe use of a third party electronic payments system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a machine learning approach to determining terms and limits on a merchant device's use of a third party electronic payments system (TPEP system). A TPEP system enables merchants to submit invoices to customers or process real time payments. The customers can pay the bill (in the case of an invoice) using a link or other widget contained in the invoice or pay the bill (in the case of real time payments) using an electronic payment processing system. The TPEP further manages the payment from a customer's account to the merchant's account. A TPEP system is controlled by a third party.

Figure 2:
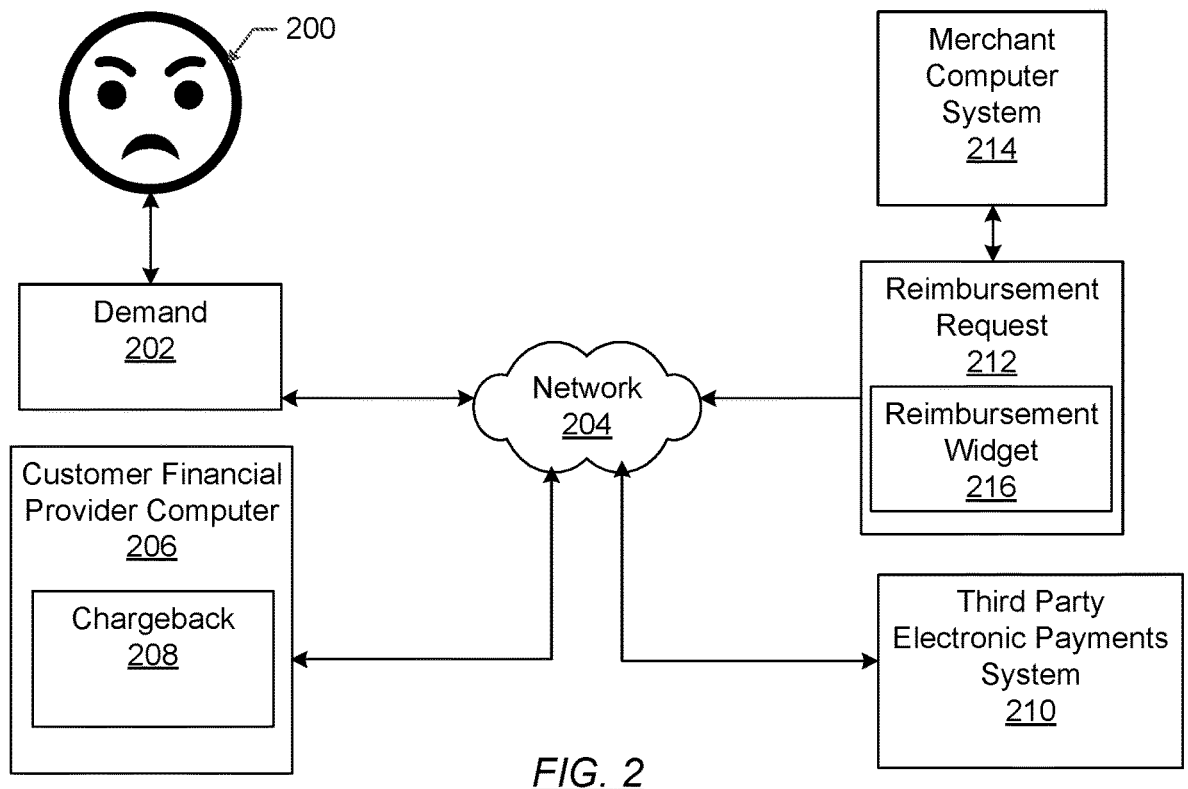

However, as explained further with respect to FIG. 1 and FIG. 2, the third party may be exposed to financial risk in this arrangement. To limit the risk, the TPEP system may impose terms and limits on the merchant based on the merchant's trustworthiness or credit worthiness. However, when a merchant applies to use the TPEP system, days or even weeks might pass before third party analysists can determine the appropriate terms and limits based on the merchant's application. As a result of the delay, merchants may become disinterested in using and paying for the TPEP system. To prevent this problem, the one or more embodiments provide a technical solution for using machine learning to automatically impose limits on the merchant applicant based on quantifiable reasons. In this manner, a merchant's application to use the TPEP system, together with any terms and limits thereon, can be processed within seconds or minutes. The technical software tools described herein thereby improve a computer system by allowing the computer system to impose quantifiable limits for quantifiable reasons. The technical software tools described herein also increase the speed of computer processing through the use of machine learning.

FIG. 1 and FIG. 2 describe use of a third party electronic payments system in accordance with one or more embodiments, and thus should be read together. FIG. 1 shows normal operation of the TPEP system, and FIG. 2 shows how use of the TPEP system may expose the third party, as well as the merchant, to financial risk. In both FIG. 1 and FIG. 2, the merchant is already using the TPEP system.

As shown in FIG. 1, a customer (100) desires to purchase a product or service from a merchant. The customer or the merchant then uses the merchant's computer system (102), or perhaps some other external computer system, to initiate generation of a payment. For example, the customer could order a product from the merchant's web site, the customer could use an on-site point of sale (PoS) system for the contemporaneous exchange of money for goods or services, or the merchant could initiate generation of an invoice for the merchant's goods or services provided to the customer (100). Thus, as used herein, the term "payment" applies to both invoice-based payments and real time payments. Likewise, the term "TPEP system," as used herein, contemplates both real time PoS systems, as well as systems which generate an invoice, which a customer or the merchant will reference when making or receiving a payment at a later time. Stated differently, the use of the term "payment," "TPEP system," "payment system," and the like refer to both "invoice" with an "electronic invoice payment system" and also "real time payment" with an "electronic real time payment system". Likewise, the term "payment request" refers to electronic generation of an invoice or electronic payment of a real time transaction.

In the case of invoicing, the payment generation request is transmitted over a network (104) to the third party electronic payments system (106), which is maintained by the third party. The third party electronic payments system (106) generates a payment request (108) and embeds in the payment request (108) a widget (110) which the customer (100) may actuate on a customer's computing device. A widget is a link, a button, a menu, or some other graphical user interface tool with which a user may interact using a computer. The actuation of the widget triggers software or other computer functionality to enable the customer (100) to electronically pay some or all of the amount of shown in the payment request (108). When the customer actuates the widget (110), the customer is prompted to input payment information. The customer may enter a credit card number, debit card number, bank account number, or some other financial account information, together with any other security information needed to conduct the electronic transaction. The widget triggers software or hardware which accesses the customer's financial provider's computer (112) and requests an electronic transfer of money. In response, the customer's financial provider computer (112) transmits money electronically to a bank account used by the merchant.

In the case of real time payments, the payment generation request need not include a widget. For example, the customer (100) could swipe a card at the merchant computer system (102), use an electronic wallet, or some other electronic payment means. In this case, the customer financial provider computer (112) transfers money directly to the merchant's account via the merchant's use of third party electronic payment system (106).

The third party charges a fee to the merchant for use of the TPEP system. The fee may be a monthly service charge, a small percentage of each transaction, or some other fee arrangement. In addition, the third party requires the merchant, via a user agreement to use the TPEP system, to reimburse the TPEP in the event that a dispute arises between the merchant and the customer (100) and that dispute results in the TPEP being required to refund money to the customer (100).

FIG. 2 shows such a scenario. In FIG. 2, an unhappy customer (200) wants his or her money back from the merchant (e.g., for faulty goods or service, failure to deliver the goods or service, or based on the customer's account being fraudulently by an identity thief to purchase the merchant's goods and services). Thus, the unhappy customer (200) uses a computing system to transmit an electronic demand (202) over the network (204) to the customer's financial provider computer (206) for a chargeback (208). In other words, the customer (200) initiates a dispute of the charge. A chargeback is the return of funds to a consumer, forcibly initiated by the issuing bank of the instrument used by a consumer to settle a debt. A chargeback is thus the forcible reversal of a prior outbound transfer of funds from a consumer's bank account, line of credit, credit card, debit card, etc. Such a forcible reversal is permitted by law under certain circumstances in some jurisdictions.

Therefore, the customer's bank (customer financial provider computer (206)) forces the merchant's provider to refund the money back to the customer's account. In this transaction scenario, the merchant's financial provider is the TPEP system maintained by the third party. Thus, the third party has to pay the refund imposed by the chargeback via the TPEP system (210).

The third party now invokes its right under the user agreement to demand that the merchant reimburse the third party for the chargeback. Thus, the TPEP system (210) transmits an electronic message including a reimbursement request (212) to the merchant computer system (214). The reimbursement request (212) may include a reimbursement widget (216). The reimbursement widget (216) is a link, a button, a menu, or some other graphical user interface tool with which a user may interact using a computer. The merchant uses the merchant computer system (214) to interact with the reimbursement widget (216). Interacting with the widget triggers software or hardware functionality to order the merchant's bank or other financial provider (not shown) to electronically pay the reimbursement funds to the third party provider via the network (204).

In other words, when the unhappy customer (200) requests a refund or a chargeback, and the request is granted, then ultimately the merchant pays for the refund or the chargeback. However, some merchants may have their own credit problems and thus are either unwilling or unable to satisfy their contractual obligation to reimburse the third party provider for the refund or chargeback. As aa result, the third party provider can be left paying for the merchant's obligation, which is undesirable for the third party provider.

Thus, the third party provider desires to limit its risk with respect to merchants failing to reimburse the third party provider for refunds and chargebacks. The third party provider also desires to limit the risk of the merchant to unexpected and potentially financially damaging liabilities. One method of limiting the risks is to impose a monetary or other use limit on the merchant's use of the TPEP. For example, the TPEP system may limit the merchant to use the TPEP system to charge only $100,000 in total payments per month, spread across all of a merchant's combined customers. In this manner, the total financial exposure to the third party is a maximum of $100,000. However, since probably not all transactions result in chargebacks, the actual financial risk to the TPEP is likely much less than $100,000.

In most cases, such limits on use of the TPEP system are only deemed necessary for merchants who are new to using the TPEP system. Once a merchant establishes a track record of several months during which the merchant satisfies the merchant's contractual obligation to reimburse the third party provider for refunds and chargebacks, the limit may be increased or even ultimately removed.

However, currently, determining limits for a new merchant applying to use the TPEP system is a slow, non-trivial task. Even if a merchant passes a basic credit check, a simple credit score is insufficient information to impose a meaningful and quantifiably justifiable limit on the merchant's use of the TPEP system, especially when such limits involve more than a simple dollar limit Additionally, a simple credit score does not inform the third party provider how big a business is, and a larger business could handle a larger potential liability and, thus, would justifiably receive a larger TPEP use limit Currently, a merchant's application to use the TPEP system is reviewed manually by one or more analysts who then determine the terms, limits, and conditions on the merchant's use of the TPEP system. Such analysis requires perhaps days of time, which may be unacceptable to a new merchant. Alternatively, a TPEP limit could be set to some arbitrary number for all applicants, or based on credit score, followed by a more thorough, manual review at a later time. However, such an option is not desirable because the TPEP provider and the merchant may be unprotected from unnecessary or unsustainable financial exposure.

Alternatively, the TPEP provider can impose a universal limit on all merchants, or base limits on a simple credit score. However, such universal limits or over-simplified determinations can discourage new merchants from using the TPEP, especially merchants with a strong financial profile who would chafe under the financial payments limits imposed by the TPEP system The TPEP provider desires to grant financially such strong merchants more leeway in using the TPEP system, in order to increases sales for the TPEP provider.

Accordingly, the TPEP provider faces a dilemma: the TPEP desires limits on the use of the system to reduce the risk of chargeback exposure, but the TPEP also desires to remove limits on the use of the system to generate more revenues when more merchants use the TPEP more often. Thus, the TPEP provider is strongly motivated to find the correct balance between limits on merchants' use of the TPEP system, and encouraging the merchants to use the TPEP system more often and for higher dollar amounts.

Therefore, the TPEP provider desires to impose meaningful and financially justifiable limits on a merchant's use of the TPEP system very quickly: within seconds or minutes of a new merchant submitting an application to use the TPEP system.

TPEP providers of merchants that are small businesses cannot feasibly perform a risk assessment individually for each small business. Specifically, the sheer number of small businesses and the speed at which small businesses are created is prohibitive for individual risk assessment determination. However, a computer does not process information in the same way as a human. Thus, a technical challenge exists in designing a computer system that performs a risk assessment and imposes meaningful and financially justifiable limits on a merchant's use of the TPEP system.

However, given that a simple credit score is insufficient to establish meaningful limits and financially justifiable reasons for the limits, the technical challenge remains. The technical challenge is how to program one or more computers to automatically and rapidly generate limits for new merchant applicants using all available information, while also providing financially justified reasons for such limits, all in a manner which is both consistent and repeatable among all potential merchant applicants. The one or more embodiments described herein address this technical challenge through a new application of machine learning. The application of machine learning not only allows a calculation process to occur when previously such a calculation process was not possible, but also increases the speed at which a computer system performs the necessary calculations.

Another technical challenge is that the information or data of use in the machine learning techniques described herein may be from many different data sources. Because the data is from many different data sources, the data is likely in many different data formats. Accordingly, no single machine learning model can aggregate the data in a meaningful way. The one or more embodiments also address this technical challenge.

Figure 3:
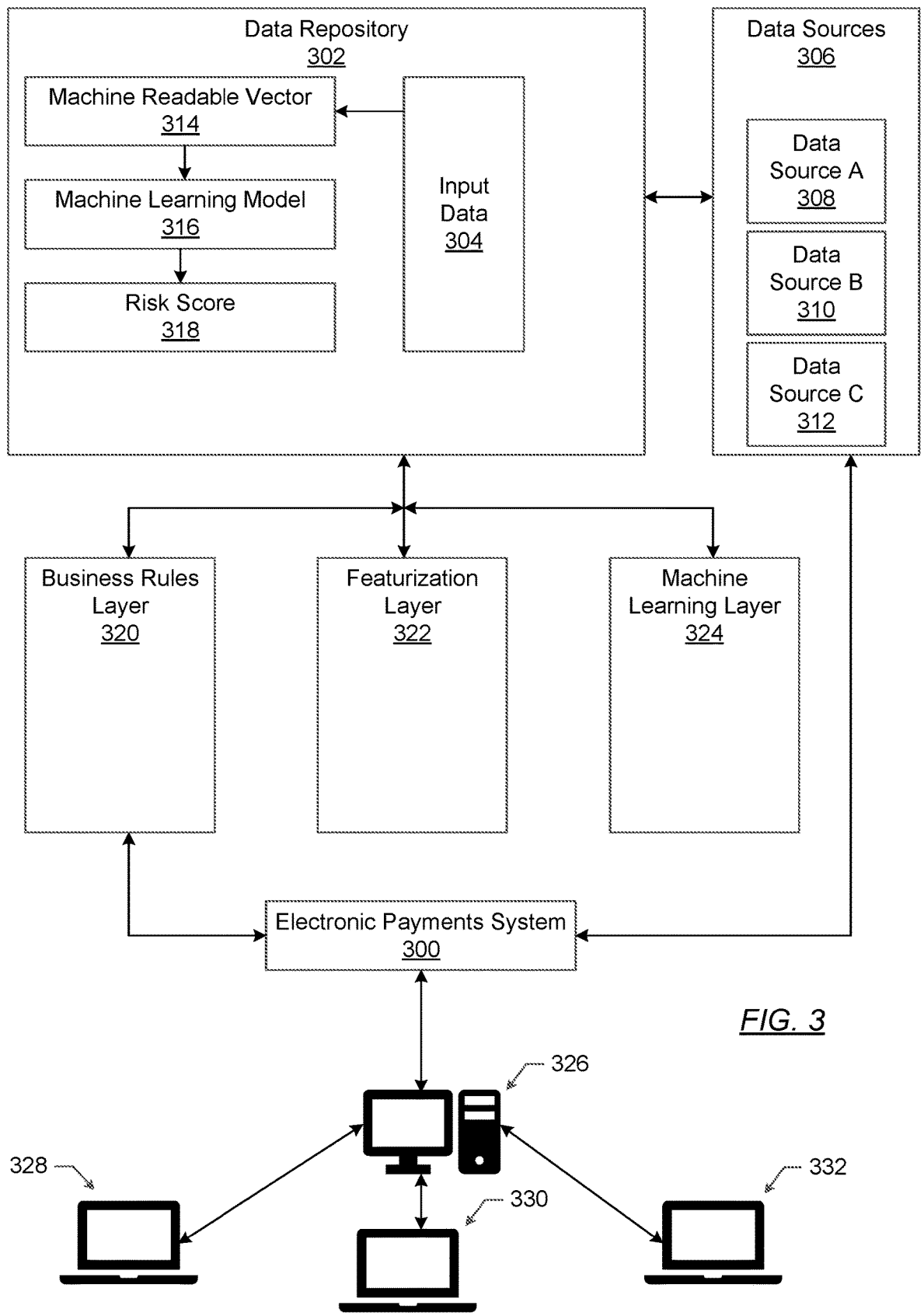
FIG. 3 shows a system for automatically determining and imposing limits on a merchant's use of a third party electronic payments system in accordance with one or more embodiments.
Figure 9A:
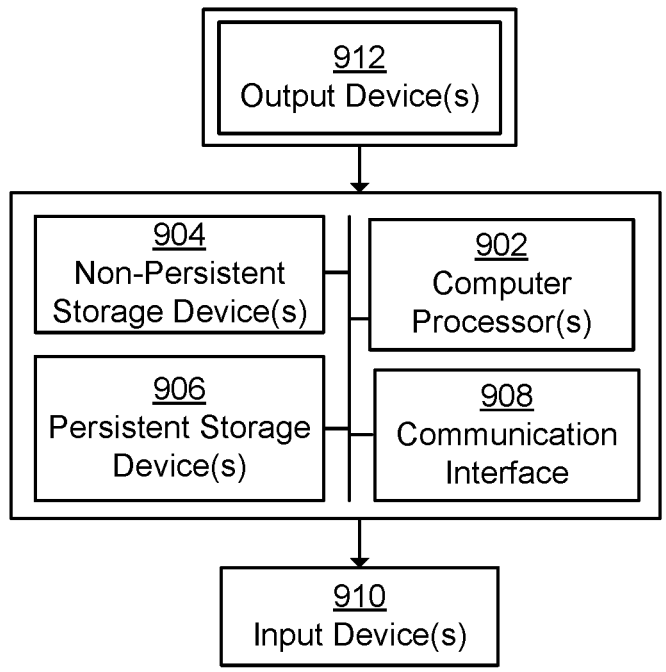
FIGS. 9A and 9B depicts a computer system and network in accordance with one or more embodiments.
Figure 9B:
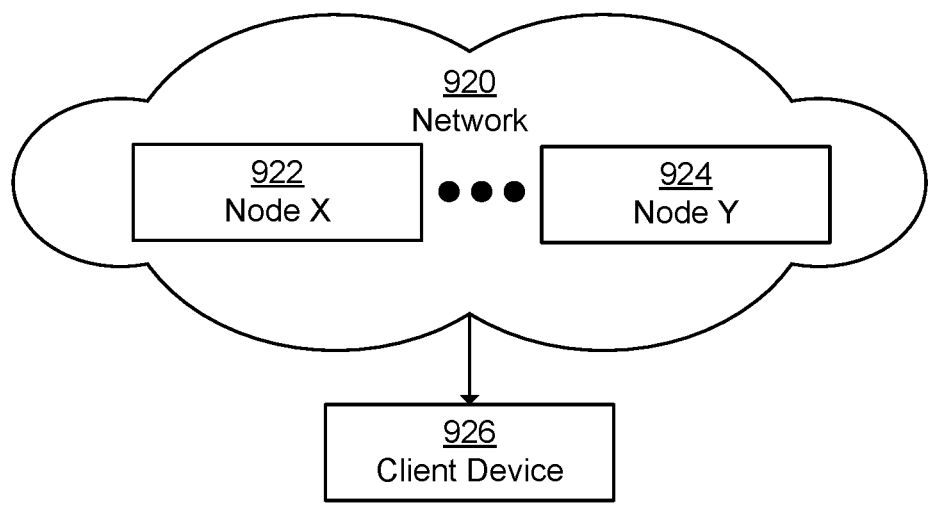

FIG. 3 shows a system for automatically determining and imposing limits on a merchant's use of a third party electronic payments (TPEP) system in accordance with one or more embodiments. The system shown in FIG. 3 may be implemented using one or more computers in a possibly distributed computing environment, such as shown in FIG. 9A and FIG. 9B. The system shown in FIG. 3 is a system for automatically imposing limits on a merchant's use of an electronic payments system (300).

Data repository (302) includes input data (304). The input data (304) may include a wide variety of data. For example, the input data (304) may include a merchant's application to use the electronic payments system (300). The input data (304) may thus described a merchant and an application by the merchant to use the TPEP system. The data repository (302) may access data from other data sources, such as data sources (306) which include data source A (308), data source B (310), and data source C (312). While the data sources (306) are shown outside of the data repository (302), some or all of the other data sources (306) may be part of the data repository (302). More or fewer data sources may be present. The data sources (306) may include data such as, but not limited to, credit reports, merchant account information, merchant revenues and expenses, merchant chargeback history, IOVATION® data, emails, background checks, IDANALYTICS® data, social media ratings of the merchant from a variety of social media platforms, and tax or financial information stored by a financial management application (FMA). The FMA is a software program which the merchant uses to manage taxes and/or finances. The FMA may be operated by the same third party provider that also manages the electronic payments system (300). Note that data is fed into the data repository (302) in parallel while an input vector (described below) is fed directly to the machine learning application model (also described below).

The input data (304) may be transformed into a single format, such as but not limited to a JAVASCRIPT® object notation (JSON), or an extensible markup language (XML) file. Transformation may be multistage, such as transforming an XML file to JSON format for the machine learning model to ingest the data. The process of extracting, transforming, and loading the data from the various data sources (306) into the input data (304) is described further with respect to FIG. 5A and FIG. 5B.

The data repository (302) also includes a machine readable vector (314). The machine readable vector (314) is a data structure configured to be input into a machine learning model (316). The machine readable vector (314) may be a multi-dimensional array of data which is composed of features and values corresponding to the features.

A feature is a type of data in the machine readable vector (314). A feature, for example, could be "monthly sales in the range of $10,000 to $50,000 per month." In turn, a value is a numerical entry for the corresponding feature. For example, a feature value for the above feature could be "1," which indicates that the business has monthly sales in that range. The feature value could be "0" to indicate that the business has more or less income in monthly sales.

Many different types of features are possible, and not all feature values need be binary in nature. For example, a feature could be "credit score" and the value of the feature "777." In an embodiment, the machine readable vector (314) may be a 1×N dimensional array of features and values, where "N" is the total number of features. The one or more embodiments contemplate differently sized arrays. Processing of the machine readable vector (314) is described further with respect to FIG. 5A and FIG. 5B.

As indicated above, the data repository (302) also includes the machine learning model (316). The machine learning model may be an unsupervised machine learning model, such as XGBoost. However, other machine learning models could be used, such as but not limited to logistic regression, a K neighbors classifier, a native Bayes, a support vector classifier (SVC), other decision tree classifiers such as a random forest classifier, or neural networks of different kinds with a sigmoid output layer.

The data repository (302) also stores a risk score (318). The risk score (318) is a number that reflects a probability that a merchant being evaluated will not be able to meet an obligation under the terms of use of the TPEP system. In one or more embodiments, the risk score may be the probability and may have a value between 0 and 1, inclusive. The machine learning model (316) takes as input the machine readable vector (314), and outputs the risk score (318). Determination of the risk score and use of the machine learning model (316) is described further with respect to FIG. 5A and FIG. 5B.

Note that the data repository (302) need not be a database, but may be some kind of physical memory. In this manner, the techniques described herein may be a near real-time system, where data retrieval, transformations, and machine learning scoring happen before or during storage of data, versus data being stored first and then scored. Further, data may be removed, and/or memory locations re-used after the data is used and before finishing the scoring.

The system shown in FIG. 3 may also include a number of software or hardware aspects. For example, a business rules layer (320) includes business rules configured to determine a merchant's terms and conditions on use of the TPEP system based on the risk score. The business rules may include other rules for automatically processing the merchant's application to use the TPEP system, or the merchant's use of the TPEP system. Thus, the business rules layer (320) may include may rules or rules packages, as well as different business rules. Operation of the business rules layer (320) is described in further detail with respect to FIG. 5A and FIG. 5B.

The system shown in FIG. 3 also includes a featurization layer (322). Featurization is the process of transforming input data into a feature vector for input to a trained machine learning model. The featurization layer (322) includes software or hardware configured to transform the input data (input data (304)) and the data in the data sources (306) into the machine readable vector (314). The machine readable vector (314) is a 1×N dimensional data structure that encodes features of the input data. The featurization layer (322) may include multiple software or hardware packages, and possibly be configured to operate in stages. Operation of the featurization layer (322) and the machine readable vector (314) are described in further detail with respect to FIG. 5A and FIG. 5B.

The system shown in FIG. 3 also includes a machine learning layer (324). The machine learning layer (324) includes software or hardware functionality for executing one or more machine learning models, such as the machine learning model (316). The machine learning layer (324) may include functionality for executing a second machine learning model, which is responsible for determining which feature or features in the machine readable vector (314) were responsible for the determination of the risk score (318) within a threshold value.

For example, a graph may be constructed which shows the degree to which each feature contributed to the risk score (318). One axis of the graph reflects the degree to which a feature contributed to a risk score, and the other axis of the graph reflects the features themselves. Thus, the graph might be displayed as a bar graph, one bar representing one feature, with those features contributing the highest contribution to the risk score having the tallest or longest bars. However, some features contributed too little to the risk score to be of interest; thus, a threshold contribution may be introduced. A threshold value could be 55%, meaning that if a given feature contributed 55% to the risk score (318) relative to the contribution of all other features, then that feature will be deemed primarily responsible for the determination of the risk score. Such a feature might to be used to determine a quantifiable reason why the merchant is subjected to a limit on the use of the TPEP system. If multiple reasons are to be generated, then multiple thresholds may be set and multiple features reported as being significant to a determination.

The feature or features that are deemed most significant may be translated into a reason. As used herein, the term "significant" refers to a feature that has a contribution value above a set threshold. For example, if the feature that contributed 55% towards the risk score (55% being the contribution value) was "liquid capital," then the reason may be reported as "available business assets are too low." Multiple significant features might be merged into one reason. Multiple significant feature might be translated into multiple reasons. One significant feature could be translated into multiple reasons. The translation of features into reasons may be implemented by one or more rules in, for example, the business rules layer (320). Ultimately, a "reason" is a human-readable explanation to be reviewed by a human user, such as a loan applicant or a customer service representative.

Note that the numbers and examples described above are only for exemplary purposes. Further operation of the machine learning layer (324) is described with respect to FIG. 5A and FIG. 5B.

The system shown in FIG. 3 may also include one or more computing systems in a possibly distributed computing environment. For example, a server system (326) may be one or more computers, in a possibly distributed computing environment, responsible for maintaining the data repository (data repository (302)), the business rules layer (320), the featurization layer (322), and the machine learning layer (324), as well as the electronic payments system (300) itself.

The server system may be in communication with a number of other computer systems outside of the control of the third party provider. For example, the system shown in FIG. 3 may also be in communication with a customer's computer (328), a financial institution's computer (330), and a merchant's computer (332). The communication between these computers facilitates the transactions described with respect to FIG. 1 and FIG. 2, and also the methods described with respect to FIG. 4 through FIG. 8.

Figure 4:
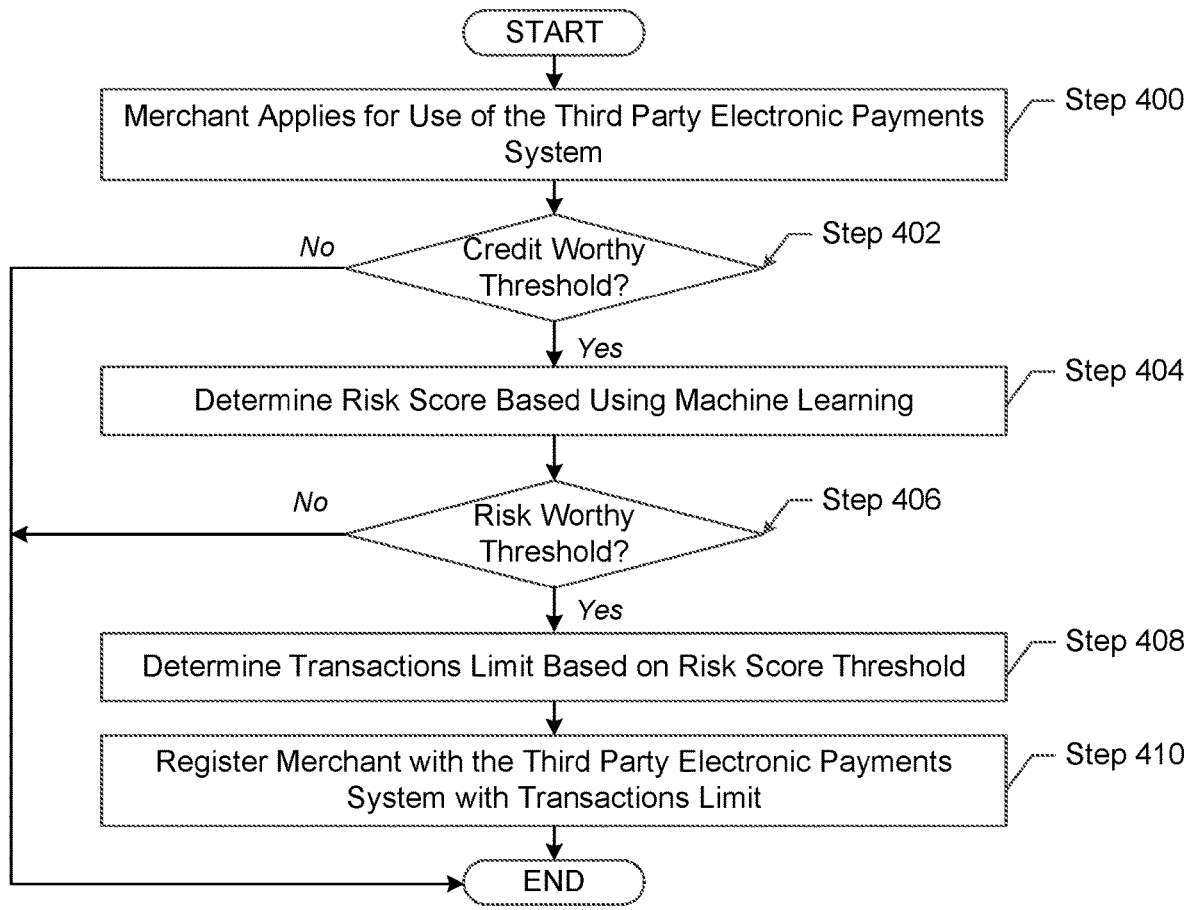
FIG. 4, FIG. 5A, and FIG. 5B show methods for automatically determining and imposing limits on a merchant's use of a third party electronic payments system in accordance with one or more embodiments.
Figure 5A:
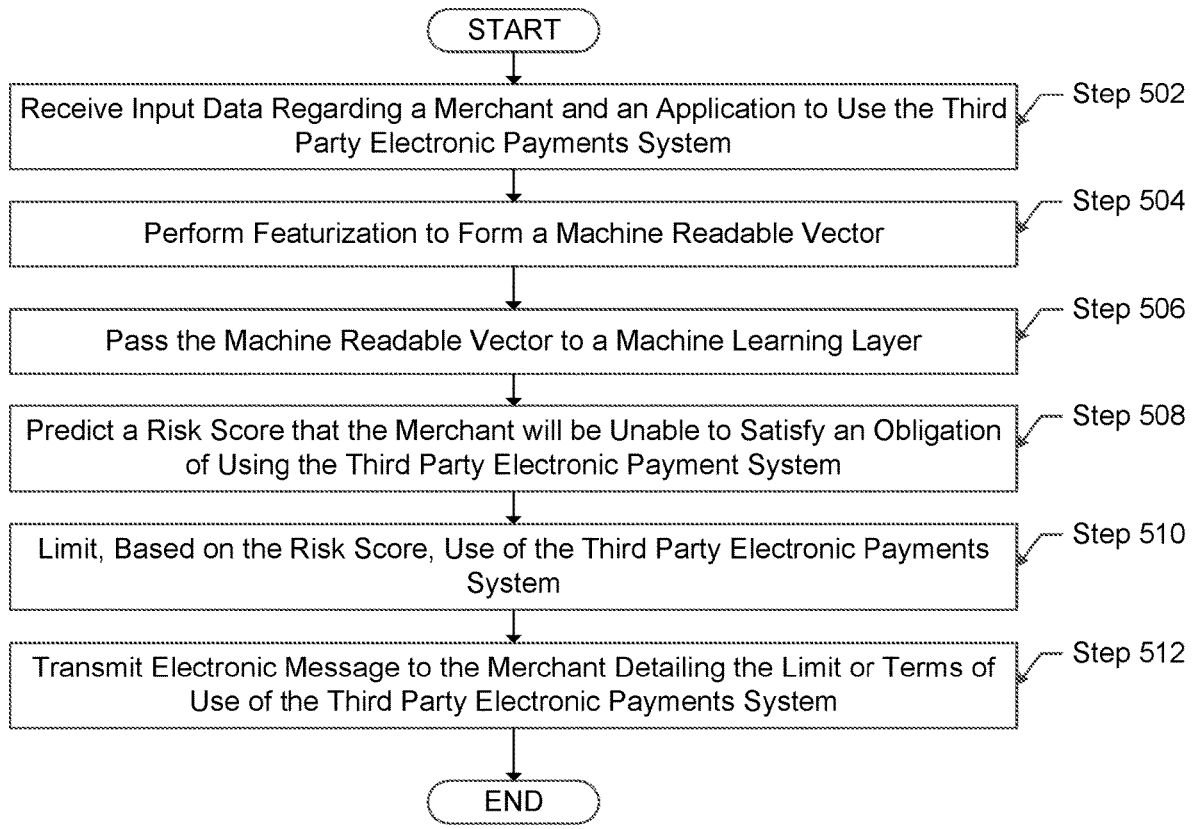
Figure 5B:
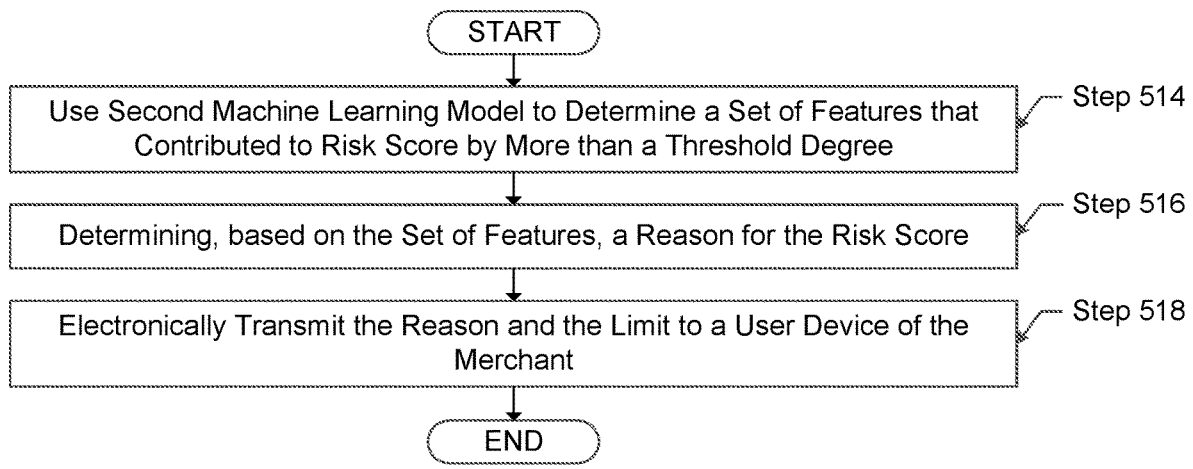

FIG. 4, FIG. 5A, and FIG. 5B show methods for automatically determining and imposing limits on a merchant's use of a third party electronic payments system in accordance with one or more embodiments. The methods shown in FIG. 4, FIG. 5A, and FIG. 5B may be implemented using the system shown in FIG. 3 or the computers and network shown in FIG. 9A and FIG. 9B.

Turning first to FIG. 4, shown is a summary of a method for registering a merchant with a TPEP system and assigning the merchant a transaction limit with the TPEP system. The process of registering a merchant to use the TPEP system, along with possibly assigning the merchant a transaction limit when using the TPEP system, may be termed "onboarding."

The method begins at step 400 when the merchant uses a computer to electronically apply for use of the third party electronic payments (TPEP) system. Optionally, at step 402, business rules determine whether the merchant passes a credit worthy threshold. For example, the third party may set a minimum credit score for a merchant to be able to use the TPEP system at all. In such a scenario, the merchant's credit score (e.g., obtained from a credit reporting agency) is compared against the minimum credit score. If the merchant does not pass the credit worthy threshold (a "no" determination at step 402), then the merchant's application is rejected, and the process terminates.

If the merchant does pass the credit worthy threshold (a "yes" determination at step 402), then at step 404 the machine learning layer will determine a risk score using machine learning. Determining a risk score using machine learning is described below with reference to FIG. 5A. Continuing with FIG. 4, at step 406, business rules will determine whether the merchant is risk worthy. Specifically, a computer processor executing the business rules determines whether the merchant is risk worthy. If not (a "no" determination at step 406), then the process terminates.

If so (a "yes" determination at step 406), then, at step 408, the business rules determine a transactions limit for the merchant's use of the TPEP system based on the risk score threshold. The transactions limit may be a dollar value, or may be a time limitation, or some other limitation. The transactions limit may be no limit at all for merchants that are in an especially strong financial position. FIG. 5A described below presents how a transaction limit may be determined.

At step 410, the business rules register the merchant with the TPEP system, possibly together with the transaction limit. The method of FIG. 4 may terminate thereafter.

The flowchart of FIG. 4 is an overview. More detailed flowcharts are described below with respect to FIG. 5A and FIG. 5B.

The methods shown in FIG. 5A and FIG. 5B may be executed using the system shown in FIG. 3, or the computers and network shown in FIG. 9A and FIG. 9B. FIG. 5A is another method of limiting a merchant's use of a third party electronic payments (TPEP) system. FIG. 5B is a related method of determining a reason for limiting the merchant's use of the TPEP system.

Turning first to FIG. 5A, at step 502, a featurization layer receives input data regarding a merchant and an application to use the TPEP system. The data may be pulled or pushed from a number of data sources, including the merchant's computer (in the form of the application), a Web browser (again, in the form of the application being filled out online by the merchant), or one or more external data sources, as described above with respect to FIG. 3.

At step 504, software and/or hardware in the featurization layer performs featurization to form a machine readable vector. Featurization aggregates, flattens, and transforms data from a variety of data sources with different data formats into the machine readable vector.

For example, the featurization layer may initially transform any data not in an extensible markup language (XML) format into the XML format. Thus, a first layer of transformation may be a parsing layer that applies defined parsing specifications to extract and place the data into the XML format in one or more data structures.

Once the data is extracted, a second layer of transformation is used to flatten the data. The process of flattening the data transforms data stored in the XML document into a relational data format. Thus, for example, the data in the XML document may be transformed into a 1×N dimensional data structure known as a vector. This dimensional format may be the final machine readable vector, though additional featurization may be performed on the 1×N dimensional data structure before the final machine readable vector is ready for input into the machine learning model.

The process of flattening data may be performed in multiple stages. For example, for EXPERIAN® and EQUIFAX® credit reports, the raw reports may include colors which indicate credit information. Thus, in a first stage categorical variables (string variables) are transformed to binary columns. For example, if a column is red, green, or blue, the first stage results in three new columns which are represented numerically. In a second stage, the columns are aggregated statistically. In the second stage, for each column, five additional columns will be created: count, sum, minimum, maximum, mean, and standard deviation. In the event a given column was transformed from categorical or string to binary, the sum of each column is added, and then a column is added that divides the sum by the total count in order to produce a percentage of a value. For example, say red was "0,0,1,1,0" for a given merchant application, then the sum column would contain the value of 2, and another column would be added with the value of ⅖ to capture the percentage of color red in a given merchant's record.

Other types of records, such as IDANALYTICS® may be processed differently because the raw data comes in two types of records: fraud records and compliance records. The two categories may be summed to determine the number of records per each category. After, for each category, the maximum may be taken in order to determine if a given category was triggered for a given application. Once the data is flattened and one wide record is available for each application, the data is sent to a machine learning DOCKER® container in the machine learning layer where the last layer of transformation is applied. Here, information is matched from one data source to the other to check for discrepancies, and distance calculations are generated between the user internet protocol address and other addresses available. Finally, one last round of hot encoding may be applied to transform categorical/string variables into numerical binary variables which form the values for the features in the machine readable vector.

Ultimately, the process of featurization produces the machine readable vector. At step 506, the machine readable vector is passed to the machine learning layer. In particular, the machine readable vector is provided as input to a machine learning model, which, in turn, is executed by a processor.

If XGBoost is used as the machine learning model, then a number of hyperparameters may be specified prior to execution of the machine learning model. A specific, but non-limiting, example of such hyperparameters may be: $'final\_max\_depth' [1] 9; $final\_subsample [1] 0.9; $final\_eta [1] 0.1; $final\_gamma [1] 2.220446e-16; $final\_mcw [1] 3; $final\_cbt [1] 0.7196861; and $final\_alpha [1] 0.1674079. More generally, the hyperparameters for a particular implementation may be determined using Bayesian optimization. The optimization metric may be mean average precision, and the evaluation metric may be the area under a curve on a receiver operating characteristic (ROC) graph. In general, a ROC graph (or curve) is a graphical plot that illustrates the diagnostic ability of a binary classifier system as its discrimination threshold is varied. The ROC curve is created by plotting the true positive rate (TPR) against the false positive rate (FPR) at various threshold settings.

Testing of machine learning models developed according to the one or more embodiments shows that the risk score calculated according to the one or more embodiments significantly outperforms a raw credit score when predicting the probability that a merchant will fail to fulfill an obligation under the terms of use of the TPEP system. In one example, the area under the ROC curve was 0.819, with 54% of merchants who actually failed to fulfill an obligation in the top 10% of risk scores. The model's area under the curve on target flag, with a confidence of 1+2, was 19.6% higher than a commercially available credit score (0.83 versus 0.70).

Training the machine learning model may be an optional step, not shown in FIG. 5A. The machine learning model may be trained using data describing past merchant behavior by many merchants over a time period, such as 90 days. The training data set includes a description of each merchant, each merchant's credit score, and instances where merchants failed to satisfy their reimbursement obligation for chargebacks under the terms of the TPEP system use agreement. Merchants' financial information may also be available via a financial management application which is used by the merchants to track their financial affairs and taxes. After the data is obtained, the data is parsed and flattened as described above, to establish known data in a machine readable vector format suitable for use by the machine learning model. Part of the known data is held back. The remaining portion of the data is provided to the machine learning model, and the machine learning model is instructed to identify patterns in the features that correlate with a merchant failing to meet a financial obligation to reimburse a chargeback. Later, the held back data is provided to the machine learning model, but this time the data describing which merchants failed to reimburse for chargebacks are also held back. The machine learning model then predicts the probability that the identified patterns of features will correspond to a merchant that will fail to reimburse a chargeback.

The results are compared to the known merchants who actually did fail to reimburse for a chargeback. If the results are considered satisfactory (i.e., a predetermined number of merchants known to have failed to reimburse for a chargeback are successfully predicted by the machine learning model to be likely to fail), then the machine learning model is considered "trained" and therefore available for use. If the results are not satisfactory, then either settings for the current machine learning model are changed, or a different machine learning model is selected. The process is then repeated. Once a satisfactory machine learning model is found, the satisfactory machine learning model is deemed "trained." The trained model may then be provided with new data for a new merchant applicant to predict a probability that the new merchant applicant will not satisfy an obligation to reimburse a chargeback, as described above.

At step 508, the machine learning model predicts a risk score that the merchant will be unable to satisfy an obligation of using the third party electronic payments system. In other words, once the machine readable vector is input into the machine learning model and the machine learning model is executed, then the output of the machine learning model is a risk score. The risk score may be passed back to a business rules layer.

At step 510, the business rules, when executed, may limit the merchant's use of the TPEP system. For example, a business rule could be that if the risk score is 0.4, then the merchant is assigned a transaction limit of $100,000 in total payments per 30 day period, but that after 90 days of satisfactory performance of the TPEP system agreement, the transaction limit will be increased to $250,000. A specific example of imposing limits on the merchant's use of the TPEP system is shown with respect to FIG. 6 through FIG. 8.

In any case, at step 512, optionally, the dollar amount of the limit or the conditions of limited use may be transmitted in an electronic message to the merchant so that the merchant understands the limitations of the use of the TPEP system. The method of FIG. 5A may terminate thereafter.

FIG. 5B shows a method for identifying a quantifiably determined reason for imposing the limit established by the method shown in FIG. 5A. The method shown in FIG. 5B may be executed prior to step 512 of FIG. 5A, and the reason or reasons determined included in the electronic message transmitted at step 512.

At step 514, a second machine learning model in the machine learning layer is used to determine a set of features that contributed to the risk score by more than a threshold degree. The second machine learning model may be executed multiple times to determine the relative importance of each of several features. A feature is assigned an importance, between 0 and 1, with 0 meaning a feature did not contribute to the risk score and a 1 indicating that one feature was the entire reason for the risk score. One or more features with importance values above a threshold number may be selected as the basis for the determination of the reason for the risk score.

In one embodiment, the second machine learning model may also be an XGBoost algorithm. In particular, to determine the set of features that contributed to the risk score by more than a threshold degree, a sensitivity analysis can be performed using the XGBoost algorithm developed above. Still more particularly, a Shapley Additive Explanations (SHAP) approach may be used to explain the output of the machine learning model. SHAP connects game theory with local explanations, and is a consistent and logically accurate additive feature attribution method. Using SHAP, a prediction can be explained by assuming that each feature value of the instance is a "player" in a game where the prediction is the payout. In other words, SHAP provides a method for knowing how to fairly distribute the "payout" among the features of a feature vector that is fed to a machine learning algorithm.

An example of the use of SHAP is now provided with respect to the one or more embodiments. Assume a machine learning prediction is made based on a customer profile. The customer profile used for the machine learning algorithm is a 1×N feature vector. For each of the N features, the value of the feature is moved. The XGBoost algorithm is executed again, and the impact of moving the feature is observed and recorded. The SHAP algorithm ranks the impact and the direction of the impact. The direction of impact is a quantitative assessment whether the change made the machine learning output bigger or smaller. Finally the SHAP algorithm sorts the ranked impacts by feature. The feature or features that have the highest rank or ranks are output as the reasons. A detailed example of a response from the machine learning application, including reasons, is provided below:

```
{
    "prediction": {
        "score": 31.0820007324,
        "histDate": "2018-10-18",
        "scoringEventId": 5247710010941847,
        "reason_codes": [
            {
                "Rank": "1",
                "Feature": "percentile",
                "Value": 17,
                "Effect": 0.4044405222,
                "Sign": "+"
            },
            {
                "Rank": "2",
                "Feature": "action",
```

```
                "Value": "MEDIUM-HIGH RISK",
                "Effect": 0.1353611946,
                "Sign": "+"
            },
            {
                "Rank": "3",
                "Feature": "yearsinfile",
                "Value": 0,
                "Effect": 0.0776505321,
                "Sign": "+"
            },
            {
                "Rank": "4",
                "Feature": "state",
                "Value": "GA",
                "Effect": 0.0712903142,
                "Sign": "+"
            },
            {
                "Rank": "5",
                "Feature": "totalaccountbalance",
                "Value": 0,
                "Effect": 0.053818211,
                "Sign": "+"
            }
        ],
        "entityId": 5247710010941847
    },
    "execution_time": 1
}
```

Thus, at step 516, business rules determine, based on the set of features, a reason for the risk score. The process of determining a reason may be termed "translation" of one or more features into one or more reasons for the risk score.

Figure 8:
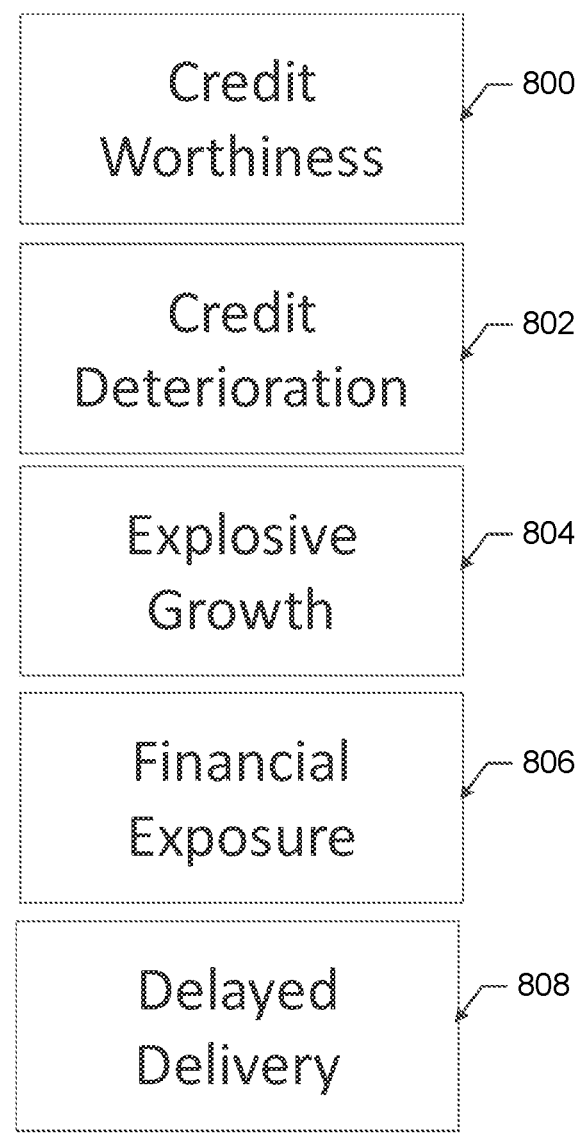
FIG. 8 shows example reasons for imposing limits on a merchant device's use of a third party payments system in accordance with one or more embodiments.

For example, assume that the feature of the highest importance was the merchant's credit score, and the feature of the second highest importance was a feature indicating that the merchant was experiencing explosive growth (e.g., doubling sales in a single month). These two features, combined, establish a reason to limit the merchant's use of the TPEP system that the merchant has had past credit problems and therefore has a higher probability of being unable to successfully handle the substantially increased business if many of those orders end up as chargebacks. Note that multiple reasons may be provided to a merchant, as shown in FIG. 8.

Note that in some embodiments, the output of the SHAP algorithm may not directly translate into a reason or reasons. In other words, the output of the SHAP algorithm may not be the reason itself. Thus, while specific input features may be the output of the SHAP algorithm, further processing may be required to determine the actual reason or reasons. For example, for the reason given above (explosive growth) could be determined based on, for example, three features, none of which directly state growth exceeding some threshold. Rather, one or more business rules are applied to the three ranked features. The one or more business rules may receive the three ranked features as input, and output "explosive growth" as a reason because the business rules correlate the presence of the three ranked features together with the output reason of "explosive growth."

In other embodiments, the output of the SHAP algorithm may be the one or more of the reasons provided. For example, if the highest ranked feature is "debt," then "debt" may be reported as the reason. Thus, additional processing of the output of the SHAP algorithm may or may not be required in order to report a reason to a merchant or a reviewer.

At step 518, the reason and the limit are electronically transmitted to a user device of the merchant. In turn, the graphical user interface of the merchant's device will display the message for the merchant to review. The method of FIG. 5A may terminate thereafter.

In this manner, the merchant understands the limits being placed on the TPEP system, as well as the reason or reasons for the decision. The merchant, upon seeing the reasons, could appeal to the TPEP provider to change the limit based on additional information that the merchant believes is relevant. In this case, a human analyst could determine whether to adjust or remove the limit; however, in the meantime, the merchant may immediately begin to use the TPEP system, with the imposed limits, while waiting for the results of the appeal.

Figure 6:
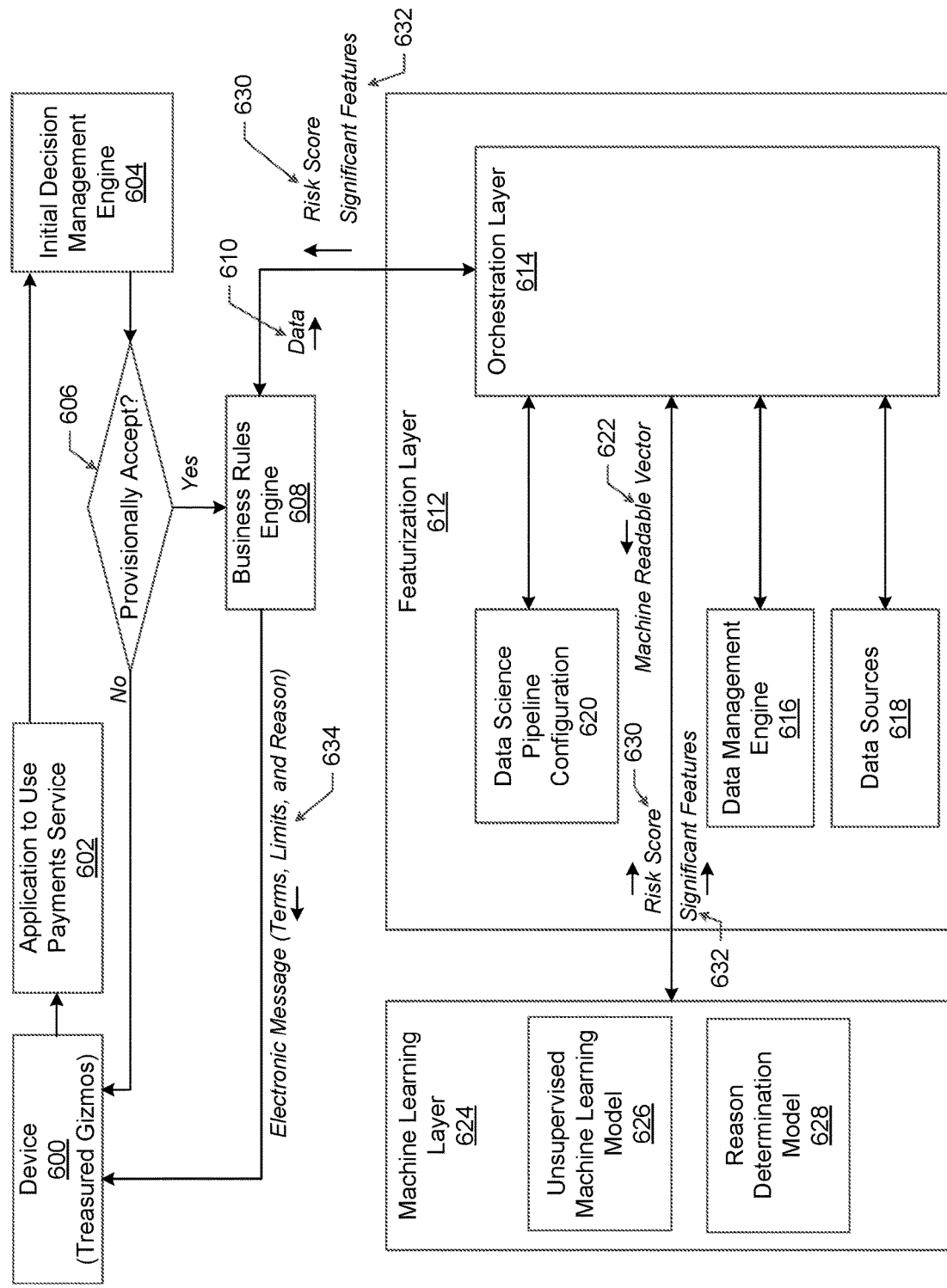
FIG. 6 shows an example of a specific system for automatically determining and imposing limits on a merchant device's use of a third party electronic payments system in accordance with one or more embodiments.

FIG. 6 shows an example of a specific system for automatically determining and imposing limits on a merchant use of a third party electronic payments system in accordance with one or more embodiments. In this example, the merchant is named "Treasured Gizmos." As described above, the process initiates when Treasured Gizmos, using a merchant device (600) submits an application (602) to use an payments decision over a network. The application is an electronic form containing data about Treasured Gizmos, including financial information supplied by Treasured Gizmos.

The application (602) is supplied to an initial decision management engine (604), which is a software program configured to execute business rules on a computer using the data in the application (602) as input. The initial decision management engine (604) may be a ZOOT® application. In a specific example, ZOOT® application may be used to retrieve data from third parties and returns the data in an XML format. An internal business rule engine, such as DROOLS® engine receives the XML formatted data and triggers the machine learning flow described above. In summary, the flow is: featurization (creating the input vector), scoring (execution of the machine learning algorithm), followed by operation of DROOLS® engine for final decision and TPEP processing limits assignment.

In addition, the initial decision management engine (604) may pull or receive other data, such as for example to obtain a credit score or a credit report from a credit reporting agency, social media reviews and information, and other data. The initial decision management engine (604) sets a low bar for passing the initial test for whether to accept the application (602). The term "low bar" means that only very low credit scores or direct indications of the untrustworthiness of Treasured Gizmos with respect to credit matters will result in failure to past the initial test. The term "very low" is defined as a pre-defined credit score selected either by a human user or empirically by past use of a machine learning model. In this specific example, a "very low" credit score is below 600.

A determination (606) is made whether to provisionally accept the application (602) of Treasured Gizmos. If not, then the application (602) is rejected and a rejection notice is electronically transmitted to the device (600). If so, then the provisional acceptance and the corresponding data is transmitted to the business rules engine (608).

In this example, the business rules engine is powered by the DROOLS® business rules management system. In some cases, the business rules engine (608) may perform pre-processing on the data, or may determine where to send the data, or may determine if all desirable data is present. If additional data is desired, the business rules engine (608) transmits commands to receive additional data from the additional data sources. Once all available desired data (610) is available, the data (610) is transmitted to the featurization layer (612), and more particularly the orchestration layer (614) within the featurization layer (612). Note that the business rules engine (608) is also programmed to handle the risk score generated through use of the featurization layer (612) and the machine learning layer (622), as described further below.

The orchestration layer (614) is one or more software packages or suites which serve to coordinate the transfer of data and the featurization to be performed on the data. In other embodiments, the orchestration layer need not be present. In this case the business rules engine (608) could handle data coordination.

The data is now parsed and flattened, as described above with respect FIG. 5A and FIG. 5B. In particular, a data management engine (616) draws data from one or more data sources (618) via the orchestration layer (614). The data is loaded into computer memory where it is parsed and flattened by a data science pipeline configuration (620). In particular, the data science pipeline configuration provides data transformations from a library of transformations. APACHE SPARK® may be used to use cluster computing to increase the speed of parsing and flattening the data. APACHE SPARK® is an open-source distributed general-purpose cluster-computing framework. APACHE SPARK® provides an interface for programming entire clusters with implicit data parallelism and fault tolerance. AKKA may be used to facilitate the transfer of data between the orchestration layer (614) and APACHE SPARK®. AKKA is a free and open-source toolkit and runtime simplifying the construction of concurrent and distributed applications on a JAVA® virtual machine.

The result of featurization is a machine readable vector (622) specifically tailored for input into a selected machine learning model. Thus, the orchestration layer (614) passes the machine readable vector (622) to the machine learning layer (624), which contains two machine learning models in this example.

The machine learning layer (624) contains an unsupervised machine learning model (626). In this example, the unsupervised machine learning model (626) is XGBoost with hyperparameters specifically defined above. The unsupervised machine learning model (626) may be hosted, executed, and configured using AWS® (AMAZON WEB SERVICES®). AWS® is a cloud computing service, which may also be used to support the featurization layer (612).

The machine readable vector (622) is provided as input to the unsupervised machine learning model (626). After execution, the unsupervised machine learning model (626) returns a risk score (630) to the orchestration layer (614).

The machine learning model may also use a reason determination model (628) to determine one or more features in the machine readable vector (622) which contributed to the risk score by more than a predetermined degree, as described above. The one or more features that qualify as meeting or exceeding the predetermined degree may be called significant features (632). The significant features (632) are also returned to the orchestration layer (614).

The orchestration layer (614) then returns the risk score (630) and the significant features (632) to the business rules engine (608). In turn, the business rules engine (608) uses pre-established business rules to determine what dollar limits to place on the Treasured Gizmos' of the TPEP system based on the risk score. In this particular example, the risk score is 0.8345, indicating a relatively high probability that Treasured Gizmos will not be able to satisfy an obligation under the TPEP to reimburse the third party for a customer's chargeback to Treasured Gizmos. Accordingly, the business rules engine (608) assigns a limit of $50,000 in total monthly payments across all of the Treasured Gizmos' customers when Treasured Gizmos uses the TPEP system, for the next 90 days. More particularly, the $50,000 limit is a rolling 30 days limit, in terms of the total dollar amounts of transactions allowed to be processed by the TPEP system. The limit is kept for 90 day, unless a manual review somehow is triggered and a manual review results in a reassessment of the TPEP limit or duration of the TPEP limit After the 90 days, the TPEP limit may be reassessed automatically, and a new TPEP limit imposed for a potentially different time period.

In addition, the business rules engine (608) generates one or more reasons for the limit. In this particular case, the significant features (632) are as follows. First, Treasured Gizmos has a credit score of 525, which is low relative to most other merchants. Second, the financial information submitted by Treasured Gizmos indicates that Treasured Gizmos is operating a business with low profit margins and low capital reserves, relative to other merchants. Third, from the Treasured Gizmos' records, Treasured Gizmos has also experienced high growth in new customers in the prior 90 days, and therefore is now more likely to experience chargebacks. Note that while sales growth can be good for a business, business growth can cause short term financial difficulties for a merchant. This fact is taken into account by the business rules when determining the terms and conditions for limits on the merchant's use of the TPEP system. In any case, from the three significant features, three human-readable reasons are generated by the business rules engine (608): low credit worthiness, explosive growth, and financial exposure.

The business rules engine (608) then applies additional rules to automatically generate an electronic message (634). The electronic message (634) conveys to the Treasured Gizmos' device (600) the terms, limits, and reasons for the terms and limits. The terms, limits, and reasons are displayed to the Treasured Gizmos on a graphical user interface of the Treasured Gizmos' device (600). The electronic message (634) may also indicate ways that the Treasured Gizmos can ameliorate or remove the limits imposed on Treasured Gizmos' use of the TPEP system. For example, the electronic message may inform Treasured Gizmos that satisfaction of the Treasured Gizmos' obligations under the terms of the TPEP system user agreement for 90 consecutive days will result in an increase of the dollar limit to $100,000.

Figure 7:
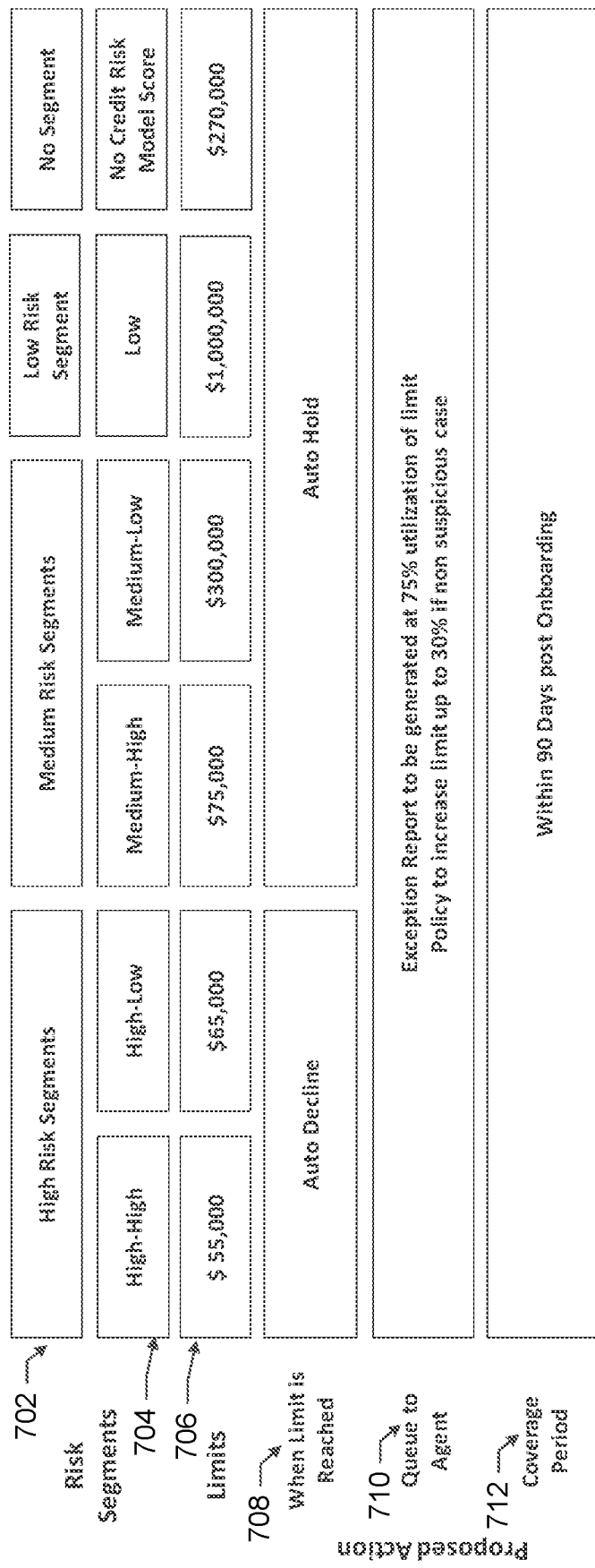
FIG. 7 is a table showing terms and limits on a merchant device's use of a third party payments system in accordance with one or more embodiments.

FIG. 7 is a table showing terms and limits on a merchant device's use of a third party payments system in accordance with one or more embodiments. In particular, the table shown in FIG. 7 shows a scheme for implementing automatic limits on merchants. The limitation scheme shown in FIG. 7 could be applied to the system shown in FIG. 3, with the method shown in FIG. 4, FIG. 5A, and FIG. 5B, or to the example shown in FIG. 6.

Merchant applicants are sorted into risk segments and risk sub-segments based on the risk score. For example, if the risk score is higher than 0.8, then a merchant applicant may be placed in the high risk segment (702) and in the high-high risk sub-segment (704). Thus, the merchant applicant is given a transaction limit of $55,000 (706) per month when payments customers using the TPEP system. Furthermore, if the merchant tries to process payments of more than $55,000, then the TPEP system is instructed to take a "limit reached" action (708). In this case, the limit reached action (708) is to automatically decline the merchant's additional attempts to use the TPEP system.

Additional limits may be imposed, and actions taken, such as indicated in the "queue to agent" (710), which indicates that a human analyst may be automatically intervene at a certain point during the merchant's use of the TPEP system. In this example, when the merchant has reached 75% of the merchant's TPEP system utilization limit, the agent is automatically instructed to review the merchant and to override the automatic limit by manually instructing the TPEP system to increase the merchant's transaction limit (by up to 30% in this case).

Additionally, a coverage period (712) may be specified, in this case a coverage period within 90 days of onboarding. Once the 90 day period is finished, assuming the merchant has reimbursed the third party for all chargebacks, limits may be automatically re-evaluated, increased, or removed altogether. Note that while FIG. 7 shows only a single coverage period (712) and queue to agent (710) for all risk categories, multiple coverage periods and human-instructed different actions may be performed under different conditions for different risk categories.

As indicated in the table shown in FIG. 7, other risk segments are possible, each representing a different range of risk scores. Each risk segment may have transaction dollar limits and different actions automatically applied to the merchant's use of the TPEP system, as determined by the business rules in the business rules engine. Note also that the table shown in FIG. 7 may be varied. More or fewer segments may be present, more or fewer transaction dollar limits may be imposed, the amount of transaction dollar limits may be varied, and different actions taken by the TPEP system at different times, either during onboarding or during ongoing merchant use of the TPEP system.

FIG. 8 shows example reasons for imposing limits on a merchant device's use of a third party payments system in accordance with one or more embodiments. The reasons shown in FIG. 8 are exemplary reasons that may be provided to a merchant in an electronic message, together with the notification of the transaction limits imposed on the merchant's use of the TPEP system. As used with respect to FIG. 8, the term "high" refers to a pre-defined numerical range with respect the risk score. The term "significant" refers to a pre-defined threshold of contribution to the risk score of a given feature within the machine readable vector relative to other features in the machine readable vector.

One reason that may be communicated electronically to the merchant is credit worthiness (800). Credit worthiness (800) indicates that a significantly contributing factor to the merchant's high risk score is the merchant's credit rating or other credit worthiness indicator.

Another reason that may be communicated electronically to the merchant is credit deterioration (802). Credit deterioration (802) indicates that a significantly contributing factor to the merchant's high risk score is a numerically-defined decline of the merchant's credit rating over a pre-determined amount of time.

Another reason that may be communicated electronically to the merchant is explosive growth (804). Explosive growth (804) indicates that a significantly contributing factor to the merchant's high risk score is a numerically defined percentage in the increase of sales or other business activity of the merchant over a pre-determined amount of time.

Another reason that may be communicated electronically to the merchant is financial exposure (806). Financial exposure (806) indicates that the merchant may have difficulties meeting the obligation to reimburse the third party for a chargeback. For example, if the merchant has working capital below a certain dollar value relative to its average of individual transaction amounts, or if the merchant operates with low margins of sales, the merchant may have difficulty meeting an obligation of use of the TPEP system.

Another reason that may be communicated electronically to the merchant is delayed delivery (808). Delayed delivery (808) indicates that a pre-determined average number of days occurs before the merchant delivers on a product or a service. Delayed delivery of products or services increases the probability that a customer will be dissatisfied with the merchant's products or services, and thus increases the probability that a customer will initiate a chargeback. Accordingly, delayed delivery by the merchant increases the financial risk exposure to the third party, and hence increases the desire by the third party to impose stricter limits on the merchant's use of the TPEP system.

Not all of the reasons shown in FIG. 8 may be used in an electronic message to a merchant. More or different reasons may be provided in the electronic message to the merchant.

Embodiments of the invention may be implemented on a computing system. Any combination of mobile, desktop, server, router, switch, embedded device, or other types of hardware may be used. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include and/or perform all or a portion of one or more embodiments of the invention.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object.

The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9A, while performing one or more embodiments of the invention, may perform data comparison. Data comparison may be used to compare two or more data values (e.g., A, B). For example, one or more embodiments may determine whether $A>B$, $A=B$, $A\mathrel{!}=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 9A and the nodes and/or client device in FIG. 9B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method comprising:
receiving, in a business rules engine of a computing system, input data from a plurality of disparate data sources, wherein the input data describes a merchant and an application by the merchant to use an electronic payments system for processing a plurality of transactions between the merchant and a plurality of customers;
performing featurization on the input data to form a machine readable vector, wherein featurization comprises transforming the input data into the machine readable vector comprising a plurality of features, and wherein performing featurization further comprises:
transmitting the input data from the business rules engine to an orchestration layer within a featurization layer,
drawing additional data from a data sources to the orchestration layer,
loading, by the orchestration layer, the input data and the additional data into a computer memory;
generating parsed and flattened data by parsing and flattening the input data and the additional data using a data science pipeline configuration in communication with the orchestration layer, wherein parsing and flattening is performed according to a plurality of data transformations specified by a library of transformations defined in the data science pipeline configuration; and
generating the machine readable vector, comprising a 1×N feature vector, with the parsed and flattened data;
training a first machine learning model using training data describing use of the electronic payments system by a plurality of other merchants, wherein training trains the first machine learning model to generate a prediction of a risk score comprising an estimated probability of the merchant being unable to satisfy an obligation of using the electronic payments system;
determining, using Bayesian optimization, a hyperparameter of the first machine learning model, wherein an optimization metric comprises a mean average precision and an evaluation metric comprises an area under a curve on a receiver operating characteristic graph created by plotting a true positive rate of the first machine learning model against a false positive rate of the first machine learning model at a plurality of threshold settings;
executing the first machine learning model using the hyperparameter, wherein the first machine learning model takes as input the machine readable vector, wherein executing the first machine learning model outputs a prediction of a risk score;

modifying, automatically, the business rules engine applying a transaction limit to the electronic payment system with respect to the merchant, wherein the transaction limit is determined based on the prediction of the risk score;

executing a second machine learning model, wherein the second machine learning model is used to determine a set of features within the machine readable vector that contributed to the prediction of the risk score by more than a threshold degree, relative to other features of the machine readable vector;

determining a reason for the transaction limit from the set of features; and transmitting the reason to a user device of the merchant.

2. The method of claim 1, wherein the transaction limit comprises a combined dollar value of the plurality of transactions.

3. The method of claim 1, wherein determining the reason is performed by the business rules engine.

4. The method of claim 3, wherein determining the reason comprises:

identifying a feature which contributed to the prediction of the risk score by a contribution value above a threshold amount relative to contribution values of other features in the set of features, wherein each contribution value is a number representing a degree to which a corresponding feature contributed to the prediction of the risk score output by the first machine learning model; and translating the feature to the reason.

5. The method of claim 1, further comprising:

transmitting, to the user device of the merchant, the transaction limit.

6. The method of claim 1, wherein the second machine learning model is used by using a Shapley Additive Explanations approach in which feature values of the plurality of features are players in a game where the prediction of the risk score is a payout.

7. A system comprising:

an electronic payments system programmed to automatically process electronic payments;

a data repository storing a first machine learning model, wherein the first machine learning model is trained using training data describing use of the electronic payments system by a plurality of other merchants, a machine readable vector comprising a plurality of features, a hyperparameter of the first machine learning model, an optimized value for the hyperparameter, an adjusted hyperparameter of the first machine learning model, a prediction of a risk score comprising an estimated probability of a merchant being unable to satisfy an obligation of using the electronic payments system to process a plurality of transactions with a plurality of customers, input data from a plurality of disparate data sources, wherein the input data describes the merchant and an application by the merchant to use the electronic payments system, a second machine learning model, and a set of features within the machine readable vector that contributed to the prediction of the risk score by more than a threshold degree, relative to other features of the machine readable vector;

a business rules engine configured to:

receive the input data prior to calculation of the prediction of the risk score;

receive the prediction of the risk score after calculation of the prediction of the risk score;

modify, automatically, the business rules engine applying a transaction limit to the electronic payment system with respect to the merchant, wherein the transaction limit is determined based on the prediction of the risk score;

determine a reason for the transaction limit from the set of features; and transmit the reason to a user device of the merchant;

a featurization layer configured to:

perform featurization on the input data to generate the machine readable vector;

transmit the input data from the business rules engine to an orchestration layer within a featurization layer, draw additional data from a data sources to the orchestration layer, load, by the orchestration layer, the input data and the additional data into a computer memory;

generate parsed and flattened data by parsing and flattening the input data and the additional data using a data science pipeline configuration in communication with the orchestration layer, where parsing and flattening is performed according to a plurality of data transformations specified by a library of transformations defined in the data science pipeline configuration; and generate the machine readable vector, comprising a 1×N feature vector, with the parsed and flattened data;

a machine learning layer configured to:

train a first machine learning model using training data describing use of the electronic payments system by a plurality of other merchants, wherein training trains the first machine learning model to generate a prediction of a risk score comprising an estimated probability of the merchant being unable to satisfy an obligation of using the electronic payments system;

determine, using Bayesian optimization, a hyperparameter of the first machine learning model, wherein an optimization metric comprises a mean average precision and an evaluation metric comprises an area under a curve on a receiver operating characteristic graph created by plotting a true positive rate of the first machine learning model against a false positive rate of the first machine learning model at a plurality of threshold settings;

receive the machine readable vector;

execute the first machine learning model using the hyperparameter and further using the machine readable vector as input, wherein the first machine learning model takes as input the machine readable vector, wherein executing the first machine learning model outputs the prediction of the risk score; and execute a second machine learning model, wherein the second machine learning model is used to determine a set of features within the machine readable vector that contributed to the prediction of the risk score by more than a threshold degree, relative to other features of the machine readable vector.

8. The system of claim 7, wherein the second machine learning model is used by using a Shapley Additive Explanations approach in which feature values of the plurality of features are players in a game where the prediction of the risk score is a payout.

9. A non-transitory computer readable medium comprising computer readable program code, the computer readable program code for causing a computer system to:

receive, in a business rules engine of a computing system, input data from a plurality of disparate data sources, wherein the input data describes a merchant and an application by the merchant to use an electronic payments system for processing a plurality of transactions between the merchant and a plurality of customers;

perform featurization on the input data to form a machine readable vector, wherein featurization comprises transforming the input data into the machine readable vector comprising a plurality of features, and wherein performing featurization further comprises;

transmitting the input data from the business rules engine to an orchestration layer within a featurization layer, drawing additional data from a data sources to the orchestration layer, loading, by the orchestration layer, the input data and the additional data into a computer memory;

generating parsed and flattened data by parsing and flattening the input data and the additional data using a data science pipeline configuration in communication with the orchestration layer, wherein parsing and flattening is performed according to a plurality of data transformations specified by a library of transformations defined in the data science pipeline configuration; and populating the machine readable vector, comprising a 1×N feature vector, with the parsed and flattened data;

training the first machine learning model using training data describing use of the electronic payments system by a plurality of other merchants, wherein training trains the first machine learning model to generate a prediction of a risk score comprising an estimated probability of the merchant being unable to satisfy an obligation of using the electronic payments system;

determine, using Bayesian optimization, a hyperparameter of the first machine learning model, wherein an optimization metric comprises a mean average precision and an evaluation metric comprises an area under a curve on a receiver operating characteristic graph created by plotting a true positive rate of the first machine learning model against a false positive rate of the first machine learning model at a plurality of threshold settings;

execute the first machine learning model using the hyperparameter, wherein the first machine learning model takes as input the machine readable vector, wherein executing the first machine learning model outputs a prediction of a risk score, wherein the first machine learning model is trained using training data describing use of the electronic payments system by a plurality of other merchants, and wherein the prediction of the risk score comprises an estimated probability of the merchant being unable to satisfy an obligation of using the electronic payments system;

modifying, automatically, the business rules engine applying a transaction limit to the electronic payment system with respect to the merchant, wherein the transaction limit is determined based on the prediction of the risk score;

execute a second machine learning model, wherein the second machine learning model is used to determine a set of features within the machine readable vector that contributed to the prediction of the risk score by more than a threshold degree, relative to other features of the machine readable vector;

determine a reason for the transaction limit from the set of features; and transmit the reason to a user device of the merchant.

10. The non-transitory computer readable medium of claim 9, wherein the transaction limit comprises a combined dollar value of the plurality of transactions.

11. The non-transitory computer readable medium of claim 10, wherein the computer readable program code is further for causing the computer system to:

transmit, to the user device of the merchant, the transaction limit, and the reason.

12. The non-transitory computer readable medium of claim 9, wherein the second machine learning model is used by using a Shapley Additive Explanations approach in which feature values of the plurality of features are players in a game where the prediction of the risk score is a payout.

* * * * *